United States Patent
Watson et al.

(10) Patent No.: US 11,155,975 B2
(45) Date of Patent: Oct. 26, 2021

(54) CONCRETE FOUNDATION FORM

(71) Applicant: Katerra Inc., Menlo Park, CA (US)

(72) Inventors: Will Watson, Seattle, WA (US); Gary Fong, Menlo Park, CA (US)

(73) Assignee: Katerra Inc., Menlo Park, CA (US)

( * ) Notice: Subject to any disclaimer, the term of this patent is extended or adjusted under 35 U.S.C. 154(b) by 0 days.

(21) Appl. No.: 16/723,284

(22) Filed: Dec. 20, 2019

(65) Prior Publication Data
US 2020/0208420 A1 Jul. 2, 2020

Related U.S. Application Data

(60) Provisional application No. 62/786,988, filed on Dec. 31, 2018.

(51) Int. Cl.
| | |
|---|---|
| *E02D 27/01* | (2006.01) |
| *E04G 17/14* | (2006.01) |
| *H04L 29/06* | (2006.01) |
| *E04G 13/00* | (2006.01) |

(52) U.S. Cl.
CPC .......... *E02D 27/013* (2013.01); *E04G 13/00* (2013.01); *E04G 17/14* (2013.01); *H04L 63/0245* (2013.01); *H04L 63/0853* (2013.01); *H04L 63/1416* (2013.01); *H04L 63/1466* (2013.01); *H04L 63/1491* (2013.01); *E02D 2250/0023* (2013.01)

(58) Field of Classification Search
CPC .. E04G 7/12; E04G 7/14; E04G 13/06; E02D 27/013; E02D 2250/0007; E02D 2250/0023; E04B 2/8652
USPC .......... 249/34, 213, 216; 52/741.13, 741.15
See application file for complete search history.

(56) References Cited

U.S. PATENT DOCUMENTS

| | | | | |
|---|---|---|---|---|
| 1,616,977 A | * | 2/1927 | Koivu ................... | E04B 2/8652 52/426 |
| 2,251,775 A | * | 8/1941 | Arrighini ................ | E04G 13/00 249/34 |
| 2,289,819 A | * | 7/1942 | Wirtane .................. | E04G 13/00 249/34 |
| 2,490,228 A | * | 12/1949 | Pontiere .................. | E04G 17/12 249/22 |
| 5,207,931 A | * | 5/1993 | Porter ..................... | E04G 13/00 249/210 |
| 5,570,552 A | * | 11/1996 | Nehring .................. | E02D 27/02 249/91 |
| 5,937,604 A | * | 8/1999 | Bowron ................. | E04G 21/185 248/229.16 |

(Continued)

FOREIGN PATENT DOCUMENTS

| | | | | |
|---|---|---|---|---|
| CA | 2905018 A1 | * | 10/2014 | ............ E04G 17/12 |
| DE | 852897 C | * | 10/1952 | ............ E04G 11/04 |

(Continued)

*Primary Examiner* — Michael Safavi
(74) *Attorney, Agent, or Firm* — Volpe Koenig

(57) ABSTRACT

A prefabricated formwork is disclosed. The prefabricated formwork of the present disclosure comprises at least one bracket comprising a first slot and a second slot, at least one first wall configured to be inserted into the first slot of the at least one bracket, and at least one second wall configured to be inserted into the second slot of the at least one bracket. The prefabricated framework may further comprise at least one support having at least one groove configured to receive the at least one bracket.

20 Claims, 3 Drawing Sheets

(56) References Cited

U.S. PATENT DOCUMENTS

| | | | | | |
|---|---|---|---|---|---|
| 5,992,114 | A | * | 11/1999 | Zelinsky | E04B 2/8652 249/216 |
| 6,044,614 | A | * | 4/2000 | Bryant | E04G 11/08 249/34 |
| 6,935,081 | B2 | * | 8/2005 | Dunn | E04B 2/8641 249/191 |
| 7,775,499 | B2 | * | 8/2010 | Metcalf | E02D 27/02 249/34 |
| 8,231,100 | B2 | * | 7/2012 | Boese | E04B 1/16 249/216 |
| 8,616,520 | B2 | * | 12/2013 | Baader | E04B 2/8647 249/40 |
| 10,753,109 | B2 | * | 8/2020 | Amend | E04B 2/8641 |
| 2018/0209115 | A1 | * | 7/2018 | Henriquez | E04B 2/8652 |

FOREIGN PATENT DOCUMENTS

| | | | | | |
|---|---|---|---|---|---|
| DE | 1459965 | A1 | * | 4/1969 | E04B 2/8652 |
| DE | 2310299 | A1 | * | 9/1974 | E04B 2/8647 |
| EP | 1304429 | A1 | * | 4/2003 | E04G 15/068 |
| FR | 483617 | A | * | 7/1917 | E04B 2/8652 |
| FR | 515787 | A | * | 4/1921 | E04B 1/161 |
| FR | 1544405 | A | * | 10/1968 | E04B 2/8652 |
| FR | 2052097 | A5 | * | 4/1971 | E04G 11/10 |
| FR | 2754285 | A1 | * | 4/1998 | E04B 1/161 |
| KR | 609500 | B1 | * | 8/2006 | E04G 17/14 |
| WO | WO-02055798 | A2 | * | 7/2002 | E04B 2/8635 |
| WO | WO-02055812 | A1 | * | 7/2002 | E04G 17/064 |

* cited by examiner

CONCRETE FOUNDATION FORM

CROSS REFERENCE TO RELATED APPLICATION

This application claims the benefit of U.S. Provisional Application No. 62/786,988 filed on Dec. 31, 2018 for CONCRETE FORM, which is incorporated by reference as if fully set forth.

FIELD OF INVENTION

The present invention relates generally to formwork, and more specifically to a prefabricated formwork.

BACKGROUND

Formwork is temporary or permanent molds into which concrete or similar materials are poured. The formwork holds the wet concrete in place until it sets or is cured. Traditionally, formwork is built on site using wood. The formwork must be measured, cut, and installed on site. Additionally, the formwork must be sufficiently braced to hold its form as the concrete is poured and cured. Because the formwork is built piece by piece on site, building formwork on site is time consuming and labor intensive.

SUMMARY

A prefabricated formwork that reduces time and labor spent on formwork is disclosed. The prefabricated formwork of the present disclosure comprises at least one bracket comprising a first slot and a second slot, at least one first wall configured to be inserted into the first slot of the at least one bracket, and at least one second wall configured to be inserted into the second slot of the at least one bracket. The prefabricated framework may further comprise at least one support having at least one groove configured to receive the at least one bracket.

BRIEF DESCRIPTION OF THE DRAWINGS

The foregoing summary, as well as the following detailed description will be better understood when read in conjunction with the appended drawings. For the purpose of illustration, there is shown in the drawings different embodiments. It should be understood, however, that the teachings are not limited to the precise prefabricated formwork shown.

DETAILED DESCRIPTION

A prefabricated formwork is provided. The prefabricated formwork is used to form a concrete structure while the concrete is poured and is curing. For example, the prefabricated formwork may be used to form a concrete foundation of a building. The prefabricated formwork is assembled off site. Once on the job site, the prefabricated formwork can be quickly and easily installed with minimal on site work. The prefabricated formwork saves construction time and money by eliminating the need to measure, cut, and install wood forms piece by piece. The prefabricated formwork includes at least one bracket, at least one first wall, and at least one second wall. The at least one bracket includes a first slot and a second slot. The at least one first wall is configured to be inserted into the first slot. The at least one second wall is configured to be inserted into the second slot.

Figure 1:
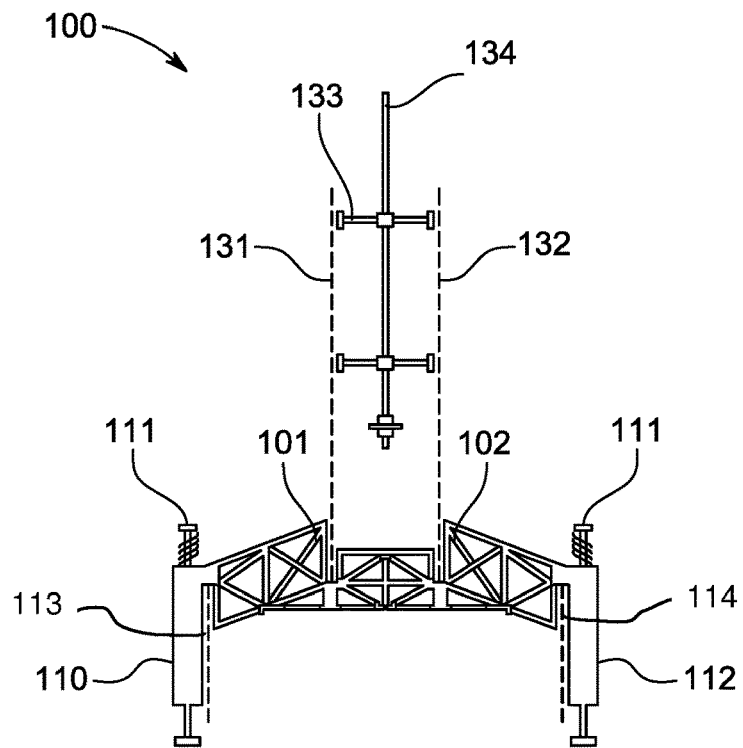
FIG. 1 is a cross-sectional view of a bracket of the prefabricated formwork.

FIG. 1 is a cross-sectional view of a bracket 100 of the prefabricated formwork. With reference to FIG. 1, the prefabricated formwork comprises at least one bracket 100. The at least one bracket 100 comprises a first slot 101 and a second slot 102. The at least one bracket 100 may also include a first arm 110 and a second arm 112. The at least one bracket 100 supports at least one first wall 131 and at least one second wall 131. The at least one first wall 131 and the at least one second wall 132 are secured to the bracket 100 and provide the form and shape of the concrete.

At least one level adjustment screw 111 is coupled to the at least one bracket 100. A portion of the at least one level adjustment screw 111 may be exposed for ease of adjustment. The at least one level adjustment screw 111 may be configured to set a final grade height. A first level adjustment screw 111 may be coupled to the first arm 110 of the at least one bracket 100 and a second level adjustment screw 111 may be coupled to the second arm 112 of the at least one bracket 100. The arms 110, 112 of the at least one bracket 100 may each comprise an opening configured to receive the at least one level adjustment screw 111. The level adjustment screw 111 extends through the opening in the arm 110, 112. The adjustment screw 111 may include threads, and the arm 110, 112 may include corresponding threads along the inner circumference of the opening. As the adjustment screw 111 is screwed or unscrewed from the opening in the arm 110, 112, the arm 110, 112 may move up and down along the adjustment screw 111. As the arm 110, 112 moves up or down, the level of the adjustment changes. The at least one level adjustment screw 111 may be comprised of recycled plastic.

At least one first wall 131 is configured to be inserted into the first slot 101 of the at least one bracket 100. At least one second wall 132 is configured to be inserted into the second slot 102 of the at least one bracket 100. The at least one first wall 131 may incorporate at least one bubble level (not shown). The at least one second wall 132 may incorporate at least one bubble level (not shown). The walls 131, 132 may each include a horizontal bubble level and/or a vertical bubble level to align the walls 131, 132 horizontally and/or vertically. The at least one first wall 131 may further comprise at least one first mating element and the first slot 101 may further comprise at least one second mating element. The at least one first mating element of the least one first wall 131 may be sized and located to mate in a male-female fashion to the second mating element of the first slot 101. For example, the first mating element may comprise a male element and the second mating element may comprise a female element. Alternatively, the first mating element may comprise a female element and the second mating element may comprise a male element. Similarly, the least one second wall 132 may further comprise at least one first mating element and the second slot 102 may further comprise at least one second mating element. The at least one first mating element of the least one second wall 132 may be sized and located to mate in a male-female fashion to the second mating element of the second slot 102. The first mating element and the second mating element allow the least one first wall 131 and the least one second wall 132 to establish a firm connection with the at least one bracket 100. The connections must hold the walls 131, 132 in place so that the walls to not move or lose shape or form as the concrete is poured and after the concrete is placed.

The at least one first wall 131 and the least one second wall 132 may be uniformly spaced apart along a length of the least one first wall 131 and the least one second wall 132. Alternatively the spacing of the at least one first wall 131 and the at least one second wall 132 and the corresponding spacing of the slots 101, 102 in the bracket 100 may vary. The prefabricated formwork may be adjusted pursuant to the concrete structure the formwork is designed to form. The walls 131, 132 are made from a rigid and strong material that may hold its form and shape against the pressure of the concrete it forms. The walls 131, 132 may be a galvanized steel, wood, or hard plastic.

At least one molded piece 133 may be configured to be inserted into the least one first wall 131 and the least one second wall 132. The at least one molded piece 133 support the first wall 131 and the second wall 131 and keep the walls 131, 132 from moving as the concrete is poured. The at least one molded piece 133 may be configured to hold an anchor bolt 134 or the like. For example, in an embodiment, the at least one molded piece 133 may include an aperture having a diameter slightly larger than the anchor bolt 134. The at least one aperture may be configured to receive and secure an anchor bolt. The at least one molded piece 133 holds the anchor bolt or the like in place while the concrete is placed and cured so that the anchor bolt or the like is cast in place. The molded piece 133 may also provide support and stability to the walls 131, 132. The number and spacing of the molded pieces 133 depends on the number and spacing required to provide sufficient support to the walls 131, 132. Alternatively, if the molded pieces 133 hold an anchor bolt, the spacing and number of molded pieces 133 depends on the number and spacing of the anchor bolts required. At least one molded piece 133 may be comprised of recycled plastic. The molded piece 133 may be permanent or temporary. If the molded piece 133 is permanent the piece 133 is left in place as the concrete cures and sets. If the molded piece 133 is temporary, the piece 133 may be removed as the concrete is placed. As the concrete is placed, the molded piece 133 may be removed when there is enough concrete to hold and support the anchor bolt in place.

Figure 2:
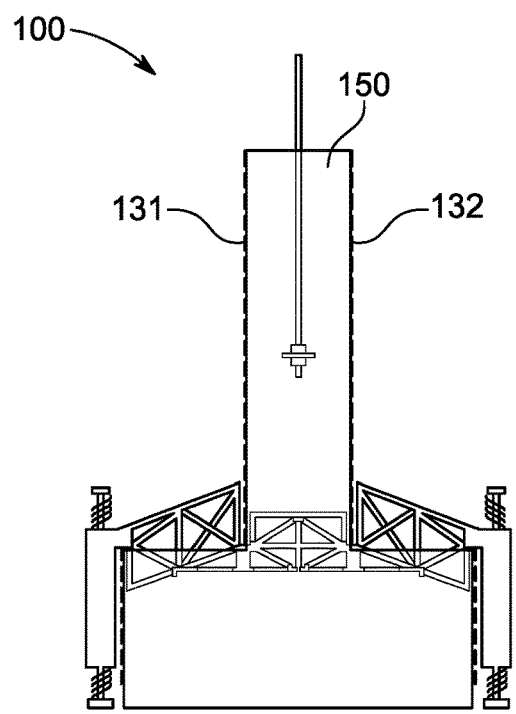
FIG. 2 is a cross-section view of the bracket of the prefabricated formwork with concrete.

As shown in FIG. 1 the prefabricated formwork may also include a first lower wall 113 and a second lower wall 114. The first lower wall 113 and the second lower wall 114 are connected to the bracket 100. The first lower wall 113 and the second lower wall 114 may be a different spacing than the first wall 131 and the second wall 132. In FIG. 2, the first lower wall 113 and the second lower wall 114 are spaced farther apart than the first wall 131 and the second wall 132 to provide a wider base. The first lower wall 113 and the second lower wall 114 may be connected to the bracket 100 by any means. For example, the lower wall 113, 114 and the bracket 100 may be attached with a male-female configuration like the first wall 131 and the second wall 132.

FIG. 2 is a cross-section view of the bracket 100 of the prefabricated formwork with concrete 150. With reference to FIG. 2, concrete 150 may be poured between the least one first wall 131 and the least one second wall 132. The least one first wall 131 and the least one second wall 132 may hold the concrete in place while it sets or is cured. The first wall 131 and the second wall 132 may be permanent or temporary. If the first wall 131 and second wall 132 are temporary, the walls 131, 132 may be removed after the concrete is cured and reaches sufficient strength. As shown in FIG. 2, the bracket 100 may be permanent. If the bracket 100 is permanent, the bracket 100 does not need to be removed after the concrete is cured. A permanent prefabricated formwork decreases the time of construction by eliminating the need to breakdown, remove, and dispose of the formwork.

Figure 3:
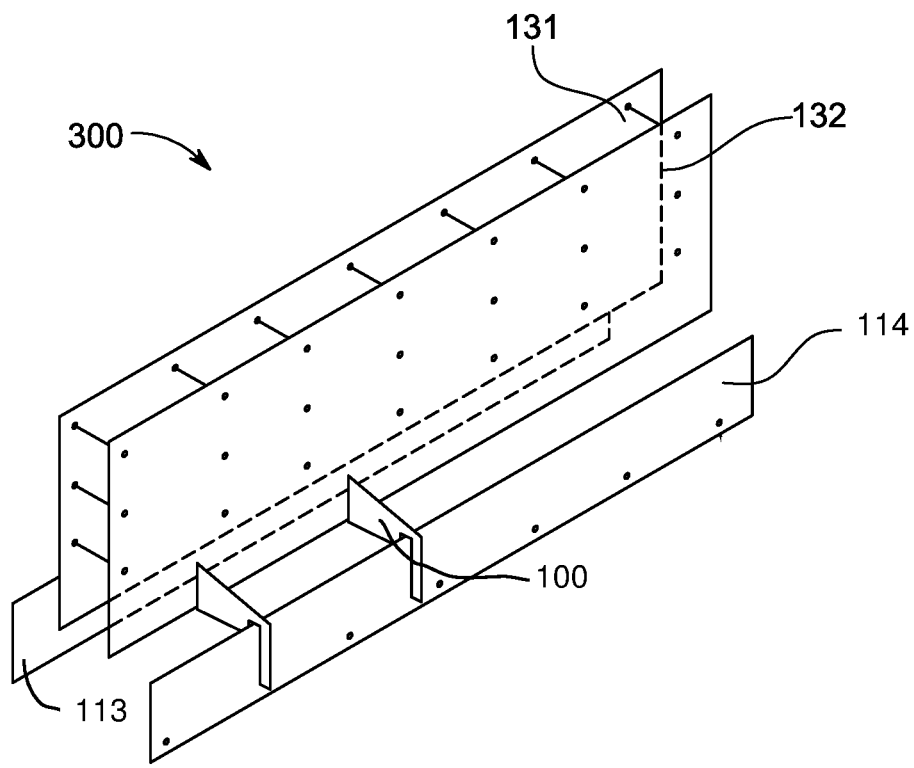
FIG. 3 is a perspective view of an assembled straight piece of the prefabricated formwork.
Figure 4:
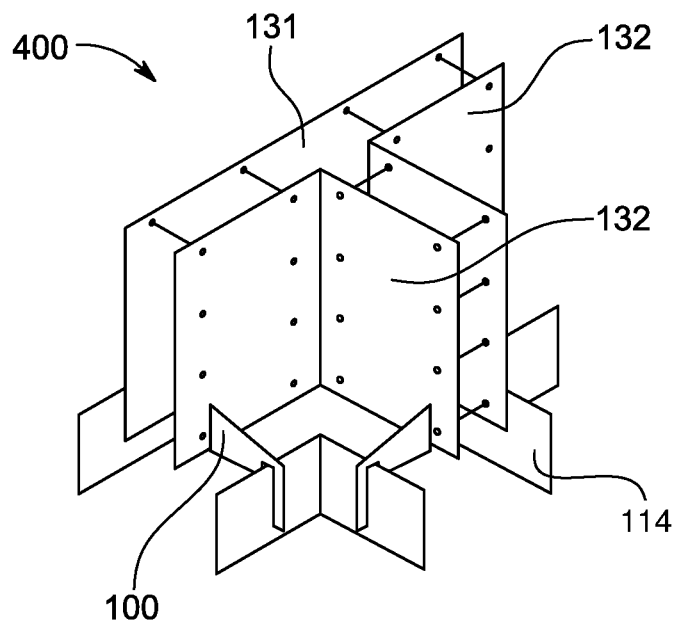
FIG. 4 is a perspective view of an assembled "T" piece of the prefabricated formwork.

With reference to FIGS. 3 and 4, the prefabricated formwork may comprise a first lower wall 113 and a second lower wall 114. The at least one bracket 100 may be configured to couple to the at least one first lower wall 113 and the at least one second lower wall 114. The at least one first lower wall 113 and at least one second lower wall 114 may be configured to receive an arm 110, 112 of the at least one bracket 100.

FIG. 3 and FIG. 4 show a perspective view of the assembled prefabricated formwork. FIG. 3 is a perspective view of an assembled straight piece 300 of the prefabricated formwork. FIG. 4 is a perspective view of an assembled "T" piece 400 of the prefabricated formwork. With reference to FIGS. 3 and 4, the at least one bracket 100, the at least one first wall 131 and the at least one second wall 132 may be coupled together to form a prefabricated formwork. Different configurations are possible. For example, the at least one bracket 100, the at least one first wall 131 and the at least one second wall 132 may be coupled together to form a straight portion 300, as illustrated in FIG. 3, or a "T" portion 400, as shown in FIG. 4. "T" portion 400 may comprise one first wall 131 and two second walls 132. The two second walls 132 may be L-shaped. Moreover, the first lower wall 113 may be straight, and the two lower walls 114 may be L-shaped. Each of the two second walls 132 may incorporate a bubble level that aligns in two directions (not shown). In a further embodiment, the bubble level is a circular bubble spirit level. As shown in FIG. 3 and FIG. 4 the first wall 131, the second wall 132, the first lower wall 113, and the second lower wall 114 are continuous. The brackets 100 are spaced along the walls 131, 132, 113, 114 to provide support, stability, and alignment to the walls 131, 132, 113, 114. The number and spacing of the brackets 100 depend on the calculated load of the poured concrete. The number and spacing of the brackets 100 should adequately support the walls 131, 132, 113, 114 so that the walls 131, 132, 113, 114 do not lose their shape or form as the concrete is poured and after the concrete is placed.

Figure 5:
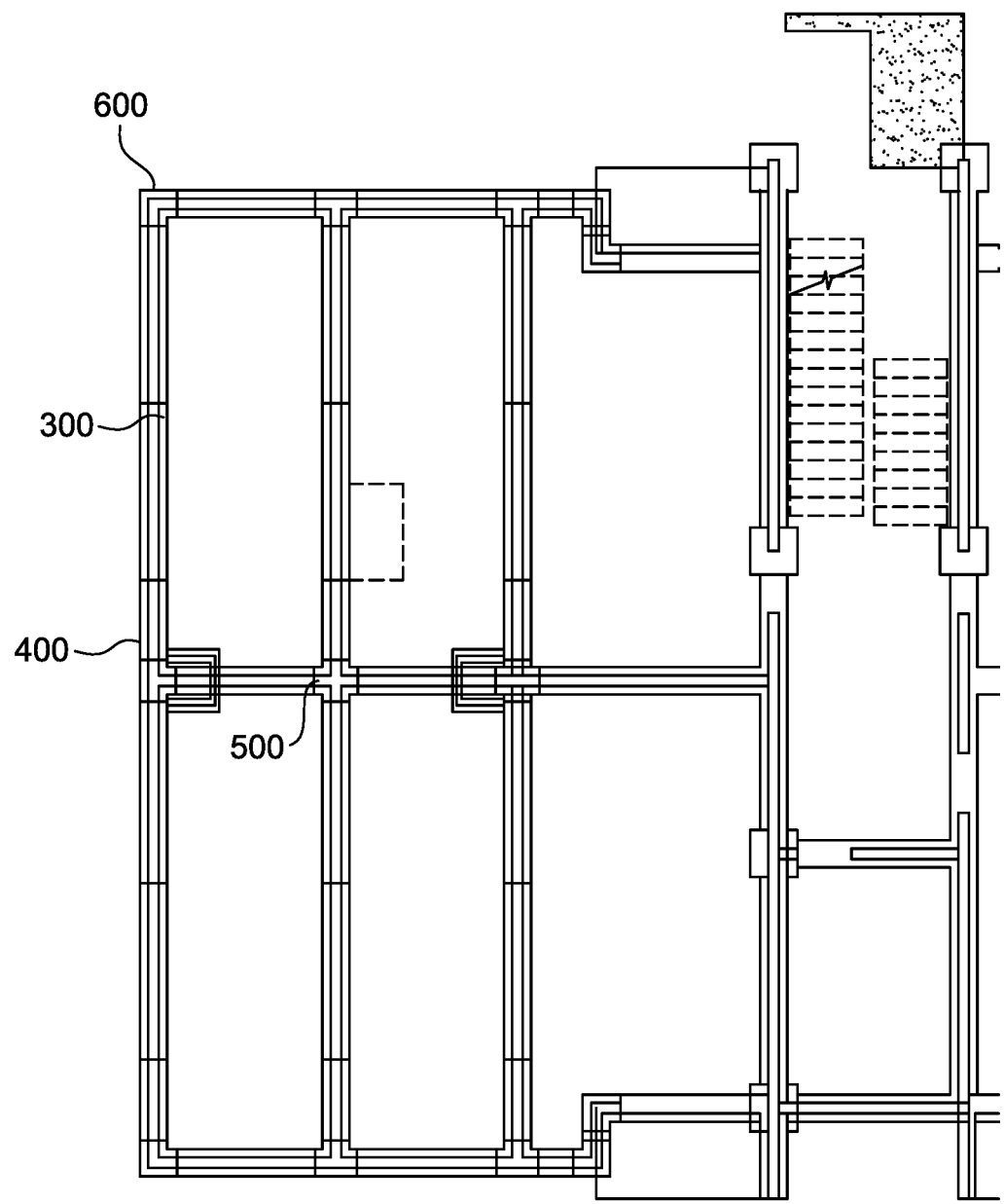
FIG. 5 is a top view of a foundation plan utilizing the prefabricated formwork.

FIG. 5 is a top view of a foundation plan utilizing the prefabricated formwork. With reference to FIG. 5, the prefabricated formwork of the present disclosure may be configured to produce the desired concrete design. For example, the prefabricated formwork of the present disclosure may include a straight portion 300, a "T" portion 400, a cross portion 500 and an L-shaped portion 600 to produce the desired formwork. The cross portion 500 may include two L-shaped first walls 131, two L-shaped second walls 132, two L-shaped first lower walls 113, and two L-shaped second lower walls 114. FIG. 5 illustrates an example layout of the prefabricated formwork to construct the foundation of a building. Many different layouts are possible with the flexible design of the prefabricated formwork.

Having thus described in detail a preferred selection of embodiments of the present invention, it is to be appreciated and will be apparent to those skilled in the art that many physical changes could be made to the prefabricated formwork without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A prefabricated formwork comprising:
   at least one first wall;
   at least one second wall;
   at least one first lower wall;
   at least one second lower wall;
   at least one bracket including a first slot configured to receive the at least one first wall, a second slot configured to receive the at least one second wall, a third slot configured to receive the at least one first lower wall, and a fourth slot configured to receive the at least one second lower wall; and
   at least one level adjustment screw coupled to the at least one bracket.

2. A prefabricated formwork comprising:
   at least one bracket comprising a first slot and a second slot;
   at least one first wall configured to be inserted into the first slot of the at least one bracket; and
   at least one second wall configured to be inserted into the second slot of the at least one bracket;
   wherein the at least one first and the at least one second wall each include a bubble level.

3. The prefabricated formwork of claim 2, wherein the at least one molded piece is comprised of recycled plastic.

4. The prefabricated formwork of claim 2, further comprising at least one first lower wall and at least one second lower wall.

5. The prefabricated formwork of claim 2, wherein the least one first wall and the least one second wall are uniformly spaced apart.

6. The prefabricated formwork of claim 2, wherein the at least one bracket, the at least one first wall and the at least one second wall are coupled together to form at least one of a straight portion, a tee portion, a cross portion and an L-shaped portion.

7. The prefabricated formwork of claim 2, wherein the at least one bracket comprises a plurality of brackets, the at least one first wall comprises a plurality of first walls and the at least one second wall comprises a plurality of second walls, and the plurality of brackets, the plurality of first walls and the plurality of second walls are configured to produce the desired formwork.

8. A prefabricated formwork comprising:
   at least one bracket comprising a first slot and a second slot;
   at least one first wall configured to be inserted into the first slot of the at least one bracket;
   at least one second wall configured to be inserted into the second slot of the at least one bracket; and
   a level adjustment screw coupled to the at least one bracket.

9. The prefabricated formwork of claim 8, wherein the at least one molded piece is comprised of recycled plastic.

10. The prefabricated formwork of claim 8, wherein the at least one level adjustment screw is configured to set final grade height.

11. The prefabricated formwork of claim 8, wherein the at least one level adjustment screw is comprised of recycled plastic.

12. The prefabricated formwork of claim 8, further comprising at least one first lower wall and at least one second lower wall.

13. The prefabricated formwork of claim 12, wherein the at least one first lower wall and the at least one second lower wall are each configured to receive the at least one bracket.

14. The prefabricated formwork of claim 8, wherein the at least one bracket, the at least one first wall and the at least one second wall are coupled together to form a straight portion.

15. The prefabricated formwork of claim 8, wherein the at least one bracket, the at least one first wall and the at least one second wall are coupled together to form a tee portion.

16. The prefabricated formwork of claim 8, wherein the at least one bracket, the at least one first wall and the at least one second wall are coupled together to form a cross portion.

17. The prefabricated formwork of claim 8, wherein the at least one bracket, the at least one first wall and the at least one second wall are coupled together to form an L-shaped portion.

18. The prefabricated formwork of claim 8, wherein the at least one bracket comprises a plurality of brackets, the at least one first wall comprises a plurality of first walls and the at least one second wall comprises a plurality of second walls, and the plurality of brackets, the plurality of first walls and the plurality of second walls are configured to produce the desired formwork.

19. The prefabricated formwork of claim 8, wherein the at least one first and the at least one second wall each include a bubble level.

20. The prefabricated formwork of claim 8, wherein the least one first wall and the least one second wall are uniformly spaced apart.

* * * * *